United States Patent
Kodaira

[15] 3,699,236
[45] Oct. 17, 1972

[54] SWITCH FLOURISH PLATE
[72] Inventor: Yasuo Kodaira, Tokyo, Japan
[73] Assignee: Nihon Kaiheiki Kogyo Kabushiki Kaisha, Tokyo, Japan
[22] Filed: April 16, 1971
[21] Appl. No.: 134,768

[30] Foreign Application Priority Data
May 20, 1970 Japan .......................45/49159

[52] U.S. Cl. ...............................174/66, 200/168 G
[51] Int. Cl. ...................................H02g 3/14
[58] Field of Search ...174/66, 67; 200/168 C, 168 G; 220/24.2, 24.3; D26/13.2, 13

[56] References Cited
UNITED STATES PATENTS

3,335,248 8/1967 Bassani .................200/168 C
3,437,738 4/1969 Wagner ..................174/66 X Primary Examiner—Lewis H. Myers
Assistant Examiner—D. A. Tone
Attorney—Lawrence I. Field

[57] ABSTRACT

The switch flourish plate includes slots provided opposite to each other in two faces of the walls of an aperture in said flourish plate and clamping projection provided adjacent to either of said two slots. This structure permits said flourish plate to be secured to an electrical switch, without using screws, rivets or the like, by means of fitting two flanges provided on the upper portion of the electrical switch to said two slots and inclining said clamping projection in the inner side direction of the switch, thereby said flanges and the clearances, which are formed between the electrical switch and a panel to which the switch is installed, to be covered.

2 Claims, 5 Drawing Figures

PATENTED OCT 17 1972 3,699,236
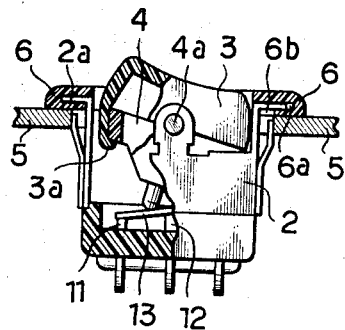
FIG. 1
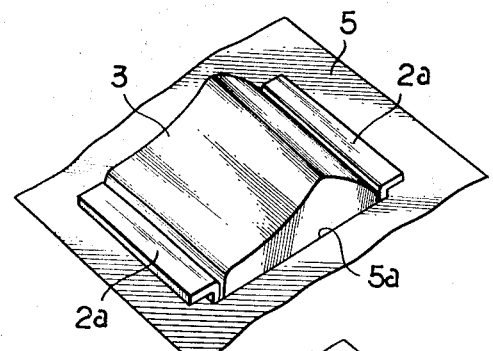
FIG. 2
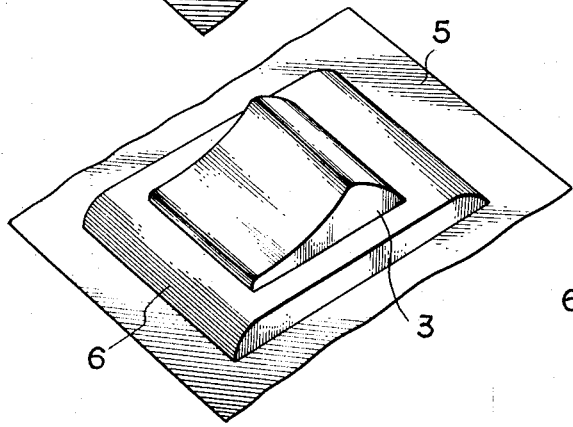
FIG. 3
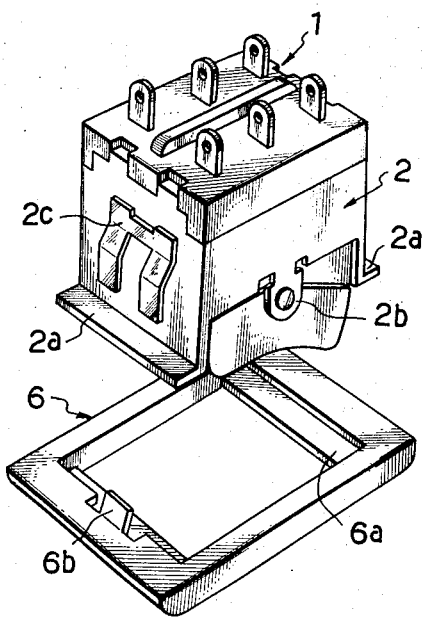
FIG. 4
FIG. 5
INVENTOR
YASUO KODAIRA
BY Lawrence J. Field
ATTORNEY

SWITCH FLOURISH PLATE

The present invention relates to a flourish plate and, more particularly, to a flourish plate which is adapted to be secured to a plug-in type electrical switch.

Conventionally, when a plug-in type electrical switch is installed to a panel, clearances are formed between the electrical switch and the panel to which the switch is installed, resulting in the entry of dust or the like into the inside of the panel through the clearances inducing short circuits bad condition of insulating and the like, and also since flanges provided on the upper portion of the switch appear on the surface of the panel, the appearance of which is not desirable.

Also, in case of an electrical switch utilizing a flourish plate, since screws are used in securing it to the switch or a panel, time is taken in screwing down the plate and also the screw heads are exposed on the surface of the plate, so that the appearance of the switch is extremely bad. In addition, since space is required to be provided with tapped holes for screwing on the flourish plate, the size thereof must be larger.

Further, in a conventional screwing-type flourish plate, there is a defect that the side wall of a switch actuator is caused to collide against the wall of an aperture in the flourish plate thereby impairing smoothness of the operation of the actuator, when the position of apertures of the flourish plate get loose from that of the corresponding apertures of panel through which the flourish plate is secured to the panel.

The present invention is provided to eliminate said defects, it is, therefore an object of the invention to provide a new switch flourish plate which may prevent entering of dusts and the like through the clearances which are formed between the switch and the panel into the interior of the panel thereby preventing causing of bad condition of insulation and other hindrances, by covering the flanges of the switch which appear on the surface of the panel when the switch is installed on the panel and by shielding the clearances which are formed between the switch and the panel, and make the external appearance of the switch beautiful.

It is another object of the present invention to provide a new switch flourish plate which may be mounted on a switch or be replaced with new one with extremely simple operation, without using means of screws or the like which obstruct the view, and may consequently be formed as a whole in a compact structure.

It is a further object of the present invention to provide a new switch flourish plate which may be secured to a switch solidly, thereby removing the looseness of installing position between them permitting the actuator of the switch to actuate smoothly.

According to the present invention, there is provided a switch flourish plate which may be formed beautifully in the external appearance and compactly as a whole, without awkward screw heads, since any means of clamping screws or the like is not required at all, and furthermore has the feature to be able to be installed and replaced with extreme ease and simplicity, since the installing of the flourish plate to the switch is finished by engagement of the clamping projection of the flourish plate to either side of the assembled switch, without detaching the actuator from the switch. Accordingly, if there are stored several flourish plates which are colored in different colors such as red, blue, yellow or the like it is a great convenience to exchange a flourish plate in a desired color quickly and easily whenever so desired as an indication plate according to the types of use of a switch or as a color plate corresponding to the color of panel or device where the plate is mounted. And also, since the flanges of the switch are perfectly covered by the flourish plate of the present invention when the switch is installed on a panel, the appearance of the surroundings of switch actuator is more beautiful.

Further, in case that a switch is installed on a panel with the flanges of the switch fitted to the flourish plate of the invention, although an installing opening of the panel is provided somewhat enlarged to form clearances between the switch and the panel, since the outer edge of the flourish plate is larger than that of the switch, the clearances are perfectly covered. Accordingly, the conventional difficult point of manufacturing, the precise perforation for a panel corresponding to the external dimension of a switch required high precision is eliminated, and there is also brought a remarkable effect that the obstructions of the drop or bad condition of insulation in the switch resulting from attachment of dusts or the like are prevented, since the entering of the dusts or the like through the clearances between the switch and the panel may be entirely eliminated.

Furthermore, since the flourish plate according to the present invention may be finally secured to the switch by means of fitting the flange of the switch to the slot provided on the inner wall of an aperture in the flourish plate and then operating the clamping projection of the plate, the switch actuator is installed in the preferable position. Accordingly, the present flourish plate has a unique feature that the smooth switching operation of the switch actuator is accomplished.

Above-mentioned and other objects, features and advantages of the present invention will become more apparent from the following description of a preferred embodiment of this invention and the appended claims as taken with reference to the accompanying drawings, in which:

FIG. 1 is a front view shown partially in section illustrating an electrical switch installed on a panel, in which the flourish plate according to the present invention is mounted;

FIG. 2 is a perspective view showing a conventional switch installed on a panel, in which a flourish plate is not mounted;

FIG. 3 is a perspective view showing an electrical switch installed on a panel, in which the flourish plate according to the present invention is mounted;

FIG. 4 is a perspective view showing the relationship of the flourish plate according to the present invention and a switch in which said plate is to be mounted; and FIG. 5 is a partially sectional view showing the relationship of the flourish plate and the switch of FIG. 4 after assembly.

The present invention will now be described in more detail by way of its preferred embodiment with reference to the drawings. Reference number 1 is a conventional switch body which is publicly known, in which are arranged contacts 11, supporting plate 12 which serves as fulcrum for the movable contact plate 13, indicative lamp and other necessary change-over mechanism.

Reference number 2 is a cover member which is secured on the switch body 1. At the top ends of both sides of the cover member 2 is provided outwardly perpendicularly bent flanges 2a. Further centrally at the top edges of said cover member are provided a pair of ears 2b each having a shaft-receiving opening. Further, the cover member 2 is provided with mounting leaf springs 2c at both sides thereof which are used when the switch is installed on a panel.

Reference number 3 is a switch actuator member which is preferably composed of a plastic material having suitable elasticity and is provided with the leg portions 3a adapted to be snugly engaged on the corresponding engaging faces of a converter member 4. It will be noted that the converter member 4 has a central opening adapted to receive a pilot lamp or lamps and also has at both sides thereof the outwardly projecting shafts 4a adapted to be received in the respective opening in the ears 2b of the cover member 2.

Reference number 5 is a panel on which the switch is installed. Number 5a is clearances which are formed between a switch and a panel.

Reference number 6 is the flourish or escutcheon or cover plate, formed as a frame and made of plastic material according to this invention and able to be colored in a suitable color, such as red, blue, yellow or the like, is provided with a rectangular opening adapted to receive the actuator 3 therethrough and on both inner walls of which is provided with a slot 6a adapted to fit to the each flange 2a of the cover member 2. As shown in FIG. 4 and 5, on the inner edge of one of the slots 6a is provided a clamping means or projection 6b adapted to secure the flourish plate to the cover member 2. In the preferred embodiment, the clamping means includes only one projection 6b, however there is no intention to limit only one, it may, of course, include a plurality of projections, even in this case, these projections are formed only on the inner wall of one of two slots 6a. Further, the slot provided on inner wall of the plate 6 is not formed necessarily on both side walls, it may be provided on only one side wall and then the projection 6b is projected on the other side of the plate 6. Furthermore, two or more clamping projections may be provided on the both inner walls of the plate 6 respectively instead of two slots 6a.

In securing the flourish plate 6, according to the present invention, to the switch, first, the flourish plate 6 is positioned on the flanges 2a of cover member 2 and then the one of the flange 2a is fitted to the slot 6a which is provided with the clamping projection 6b, whereby the end of the other flange 2a is located at the edge of the other slot 6a as shown in FIG. 5. And then under this state, the projection 6b is bent in the direction of the side of the cover member 2 or of the right hand in FIG. 5 to contact and press the external side of the cover member 2, whereby the flourish plate 6 is moved in the right hand direction in FIG. 5. In this case the projection 6b may be bent after the flourish plate 6 is moved in the right hand direction in FIG. 5. Therefore, the flange 2a in the right hand of the cover member 2 is perfectly fitted in the corresponding slot 6a in the right hand of the flourish plate whereby the flourish plate 6 is rigidly secured to the flanges 2a of the cover member 2. Still more in FIG. 5, the clamping projection 6b is in the erected condition, however, in case that the flange 2a of the side on which no clamping projection is provided is rigidly fitted in the slot 6a of the flourish plate 6, the clamping projection 6b is in the condition of inclination, as shown in FIG. 1.

When the switch which is thus mounted with the flourish plate according to the present invention, is installed on the panel 5 as seen in FIG. 1 or FIG. 3, since the clamping projection 6b is pressed by the surface of the panel 5, there is no apprehension that the flourish plate 6 is caused to displace or detach from the flanges 2a of the cover member 2 by erection thereof in use of the switch.

While the present invention has been described by way of its preferred embodiment, it is to be understood that various changes and modifications can be made without departing from the spirit and scope of the present invention which is to be defined only by the claims which follow.

What is claimed is:

1. An electrical Switch flourish plate having an aperture therein adapted to receive and support an electrical switch therein, the improvement comprising providing a slot in each of two walls of said aperture, each said slot being adapted to receive a flange on a switch cover member enclosing said switch and clamping means associated with said slot in order to secure said flanges in said slots.

2. An electrical switch flourish plate according to claim 1, in which each of said clamping means is composed of more than two projections respectively.

* * * * *